United States Patent [19]

Kostka et al.

[11] 4,331,443
[45] * May 25, 1982

[54] CONCENTRATED SOLUTIONS OF WATER-INSOLUBLE COUPLING COMPONENTS

[75] Inventors: Rudolf Kostka; Hasso Hertel, both of Mühlheim, Fed. Rep. of Germany

[73] Assignee: Hoechst Aktiengesellschaft, Frankfurt, Fed. Rep. of Germany

[*] Notice: The portion of the term of this patent subsequent to Mar. 14, 1995, has been disclaimed.

[21] Appl. No.: 122,451

[22] Filed: Feb. 19, 1980

[30] Foreign Application Priority Data

Feb. 22, 1979 [DE] Fed. Rep. of Germany ....... 2906805

[51] Int. Cl.³ .......................... C09B 27/00; D06P 1/02
[52] U.S. Cl. ............................................. 8/671; 8/666
[58] Field of Search ..................................... 8/666, 671

[56] References Cited

U.S. PATENT DOCUMENTS

| 1,505,569 | 8/1924 | Laska | 8/671 |
| 2,048,796 | 7/1936 | Kirk et al. | 8/671 |
| 2,883,258 | 4/1959 | Spitzer et al. | 8/666 |
| 3,787,175 | 1/1974 | Von der Eltz et al. | 8/666 |
| 4,057,389 | 11/1977 | Fees et al. | 8/666 |
| 4,078,887 | 3/1978 | Kostka et al. | 8/666 |
| 4,094,637 | 6/1978 | Fees et al. | 8/671 |
| 4,115,054 | 9/1978 | Hermes | 8/609 |

Primary Examiner—Maria Parrish Tungol
Attorney, Agent, or Firm—Connolly and Hutz

[57] ABSTRACT

Concentrated solutions of water-insoluble bis-acetoacetic acid-diphenylamides as coupling components; these solutions contain in addition to one or more of these coupling components water and sodium and/or potassium hydroxide and as aliphatic solvent one or more mono- or di- to hexa-ethyleneglycol monoalkyl ethers having lower alkyl radicals, and optionally ethyleneglycol, diethyleneglycol and/or propyleneglycol. The coupling components are contained in the solutions in a concentration of up to about 50% by weight without deteriorating the storage stability of the solutions. The solutions may be used for preparing water-insoluble azo dyestuffs on the fiber according to "ice-color" dyeing. On pouring into water containing a small amount of sodium hydroxide they give immediately ready-to-use impregnation baths.

8 Claims, No Drawings

CONCENTRATED SOLUTIONS OF WATER-INSOLUBLE COUPLING COMPONENTS

Water-insoluble compounds which because of their enolic hydroxy group are capable of azo coupling are important intermediate products for dyestuffs, and therefore used for a long time for producing water-insoluble azo dyes on the fiber according to the methods of ice-color dyeing. These coupling components are used in alkaline solutions of low concentration. However, dissolution of the coupling components is somewhat difficult. In aqueous sodium hydroxide solution they can be dissolved by boiling only, and when they are to be dissolved at room temperature they must first be pasted with ethanol and then dissolved by adding sodium hydroxide solution and water (see NaphtholAS Anwendungsschriften of Farbwerke Hoechst AG, No. 4026). Coupling components of this kind for ice-color dyeing are, for example, arylamides of acylacetic acid.

Because of the above difficulties of dissolving these coupling components which difficulties are especially disadvantageous in ice-color dyeing on an industrial scale, there was for a long time a demand for formulations of such coupling components which yield ready-to-use impregnation baths on simple pouring the formulations into an aqueous sodium hydroxide solution. U.S. Pat. No. 2,883,258, for example, describes solutions of defined coupling components in a mixture of ethyleneglycol, water, sodium or potassium hydroxide and optionally methanol. In the case of acylacetic acid arylamides, however, a sufficiently high concentration of the coupling component is not obtained in these solvent mixtures; in the case of 4,4'-bis-acetoacetylamino-3,3'-dimethyl-diphenyl (Colour Index No. 37,610), for example, a concentration of merely up to 20% by weight of this compound in the solutions can be achieved.

Furthermore, solutions of coupling components for icecolor dyeing are known from German Pat. No. 2,552,717, which contain as solvent a mixture of water, sodium or potassium hydroxide and diethyleneglycol, and optionally ethyleneglycol and/or propyleneglycol. In the case of 4,4'-bis-acetoacetylamino-3,3'-dimethyl-diphenyl, a solution is obtained which contains 30% by weight of this coupling component at most only.

For reasons of cost and transport, however, it is desirable to supply the market with solutions of coupling components in a substantially high concentration, which can be used on an industrial scale.

The present invention allows to get rid of the disadvantages described above. It provides concentrated solutions of coupling components which are suitable for ice-color dyeing, which contain as coupling component(s) one or more compounds of formula (1).

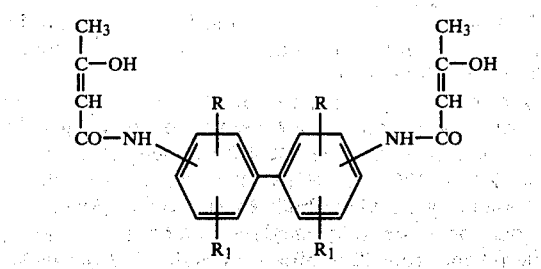

in which R and $R_1$ are identical or different and each is a hydrogen atom such as chlorine or bromine atom, preferably chlorine atom, a lower alkyl group having especially from 1 to 4 carbon atoms, preferably methyl or ethyl, or a lower alkoxy group having especially from 1 to 4 carbon atoms, preferably methoxy or ethoxy, and which contain water, sodium hydroxide or potassium hydroxide or both and optionally ethyleneglycol, diethyleneglycol (of the formula OH—CH$_2$—CH$_2$—O—CH$_2$—CH$_2$—OH), propyleneglycol or a mixture thereof, and as characteristic of the invention one or more compounds selected from the group of mono-, di-, tri-, tetra-, penta- and hexa-ethyleneglycol mono-(lower alkyl) ethers, or which consist essentially of these ingredients.

The solutions of the invention may contain the coupling component(s) of formula (1) in a concentration of, in total, up to about 50% by weight, such as 25 to 50, especially 35 to 50% by weight. Especially, the solutions of the invention comprise solutions containing or consisting essentially of one or more compounds of the formula (1) in a total concentration of from 35 to 45, preferably 40 to 45, % by weight, from 3 to 25, preferably 5 to 20, % by weight of water, from 2 to 12, preferably 2.5 to 10, % by weight of sodium hydroxide or potassium hydroxide or both, and from 15 to 45, preferably 25 to 45, % by weight in total of one or more compounds selected from the group of the above mentioned mono- and polyethyleneglycol monoalkyl ethers or, alternatively, from 5 to 50, preferably 7 to 45, % by weight in total of one or more of the above mono- and polyethyleneglycol monoalkyl ethers and from 10 to 30% weight in total of one or more compounds selected from the group of ethyleneglycol, diethyleneglycol and propyleneglycol.

Ethyleneglycol mono-(lower alkyl) ethers are preferably those having from 1 to 4, preferably 2 or 3, carbon atoms in the alkyl moiety, and the ethyleneglycol residue of which consists of 1 to 4 ethyleneglycol moieties. Especially suitable are the monomethyl ethers, monoethyl ethers, monopropyl ethers or monobutyl ethers of ethyleneglycol, diethyleneglycol, tri- or tetraethyleneglycol. Preferably, mono- or diethyleneglycol mono-(lower alkyl) ethers are employed as solvent either per se or in admixture with ethyleneglycol or diethyleneglycol or both.

The acylamide radicals of the bis-acetoacetic diphenylamides of formula (1) are preferably in the 4- and 4'-positions of the diphenyl. Preferred are solutions of the invention which contain a compound of the formula (1) in which each $R_1$ is hydrogen, and solutions containing a compound of formula (1) in which each R is in the 3- and 3'-positions of the diphenyl. Especially preferred are solutions according to the invention containing 4,4'-bis-acetoacetylamino-3,3'-dimethoxy-diphenyl, 4,4'-bis-acetoacetylamino-3,3'-dichloro-diphenyl, and above all 4,4'-bis-acetoacetylamino-3,3'-dimethyl-diphenyl.

The solutions of the invention may be prepared by simply stirring the coupling components with a mixture of water, a sodium hydroxide solution and/or potassium hydroxide solution and the ethyleneglycol monoalkyl ether and optionally of ethyleneglycol, diethyleneglycol and/or propyleneglycol, at a temperature of from 10° to 30° C., generally at room temperature.

When mixtures of the above-mentioned ethyleneglycol monoalkyl ether(s) with ethyleneglycol, diethyleneglycol and/or propyleneglycol are used as solvents in the solutions according to the invention, the optimum ratio of these components depends on the kind of coupling component; it can easily be found out in a preliminary test. The same is valid for the amount of water. Sodium hydroxide potassium hydroxide or both are present in the solutions of the invention in a ratio of 1 to 1.15 mol per mol of coupling component.

The solutions of the invention have a very good stability to storage. Even at a change of the temperature or on prolonged storage at 0° C., there are no signs of crystallization. When poured into water which contains a small amount of sodium hydroxide, they give immediately ready-to-use impregnation baths.

The following Examples illustrate the invention; parts and percentages are by weight unless otherwise stated. Parts by weight and parts by volume are in a ratio as that of kilogram to liter.

EXAMPLE 1

400 Parts of 4,4'-bis-acetoacetylamino-3,3'-dimethyl-diphenyl are stirred into a mixture of 400 parts of diethyleneglycol monomethyl ether and 200 parts of an aqueous 45% sodium hydroxide solution. Stirring is continued for about 30 minutes until complete dissolution, thus obtaining a solution stable to storage of 4,4'-bis-acetoacetylamino-3,3'-dimethyl-diphenyl of 40% strength.

EXAMPLE 2

Operations for preparing a solution of the invention are as in Example 1; however, instead of 400 parts of diethyleneglycol monomethyl ether a mixture of 200 parts of ethyleneglycol monomethyl ether and 200 parts of ethyleneglycol is used. A solution stable to storage is obtained also in this case.

EXAMPLE 3

Operations for preparing a solution of the invention are as in Example 1; however, instead of 400 parts of diethyleneglycol monomethyl ether a mixture of 300 parts of diethyleneglycol monomethyl ether and 100 parts of diethyleneglycol is used. A solution stable to storage is obtained also in this case.

EXAMPLE 4

Operations for preparing a solution of the invention are as in Example 1; however, instead of 400 parts of diethyleneglycol monomethyl ether a mixture of 300 parts of ethyleneglycol monomethyl ether and 100 parts of diethyleneglycol is used. A solution to storage is obtained also in this case.

EXAMPLE OF APPLICATION 1

For preparing an impregnation bath for continuous dyeing, 940 parts of softened water having a temperature of about 20° C. are mixed with 11.4 parts by volume of an aqueous 32.5% sodium hydroxide solution and 5 parts of a fatty acid-protein degradation product-condensate. Subsequently, 44 parts of the solution (according to the invention) of 4,4'-bis-acetoacetylamino-3,3'-dimethyl-diphenyl of Example 1 are stirred in. A colorless solution is obtained which is immediately ready-for-use.

EXAMPLE OF APPLICATION 2

For preparing an impregnation bath for exhaust dyeing, 990 parts of softened water having room temperature are stirred with 30 parts of sodium chloride, 3.1 parts by volume of an aqoues 32.5% sodium hydroxide solution and 2 parts of a formaldehyde/naphthalenesulfonic acid condensate. 12.1 parts of the solution according to the invention of Example 1 are then added with stirring. The colorless solution obtained is immediately ready-for-use and is preferably applied in a goods-to-liquor ratio of 1:20.

We claim:

1. A concentrated solution of an acetoacetic acid diphenylamide, containing one or more compounds of formula (1)

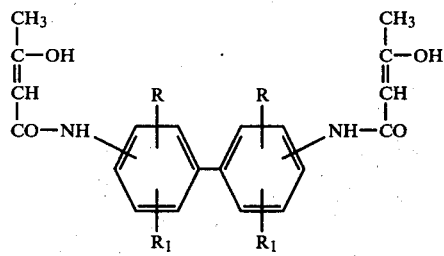

(in which R and $R_1$ are identical or different and each is hydrogen, halogen, lower alkyl or lower alkoxy), water, sodium hydroxide or potassium hydroxide or both, and one or more aliphatic solvents selected from the group of mono- to hexa-ethyleneglycol mono-(lower alkyl) ethers.

2. A solution according to claim 1, containing additionally ethyleneglycol, diethyleneglycol or propyleneglycol or a mixture thereof.

3. A solution according to claim 1 or 2, containing the compound(s) of formula (1) in a concentration of, in total, 25 to 50% by weight.

4. A solution according to claim 1, containing from 35 to 45% by weight in total of the compound(s) of formula (1), from 3 to 25% by weight of water, from 2 to 12% by weight in total of sodium hydroxide or potassium hydroxide or both, and from 15 to 45% by weight, in total, of one or more of the compounds selected from the group of mono- and polyethyleneglycol mono-(lower alkyl) ethers.

5. A solution according to claim 2, containing from 35 to 45% by weight, in total, of the compound(s) of formula (1) from 3 to 25% by weight of water, from 2 to 12% by weight, in total, of sodium hydroxide or potassium hydroxide or both, and from 10 to 30% by weight, in total, of ethyleneglycol, diethyleneglycol or porpyleneglycol or a mixture thereof, and from 5 to 50% by weight, in total, of one or more of the compounds selected from the group of mono- and polyethyleneglycol mono-(lower alkyl) ethers.

6. A solution according to claim 1 or 2, wherein each $R_1$ is hydrogen.

7. A solution according to claim 1 or 2, wherein the compound of formula (1) is 4,4'-bis-acetoacetylamino-3,3'-dimethyl-diphenyl.

8. A solution according to claim 1, containing from 35 to 45% by weight of 4,4'-bis-acetoacetylamino-3,3'-dimethyl-diphenyl, from 5 to 20% by weight of water, from 2.5 to 10% by weight of sodium hydroxide or potassium hydroxide or both, from 7 to 45% by weight of one or more ethyleneglycol mono-(lower alkyl) ether(s) and from 10 to 30% by weight of ethyleneglycol, diethyleneglycol or propyleneglycol or a mixture thereof.

* * * * *